United States Patent Office 3,197,398
Patented July 27, 1965

3,197,398
HYDROGENATION PROCESS AND CATALYST COMPRISING A CRYSTALLINE ZEOLITE CONTAINING A GROUP VIII METAL
Dean Arthur Young, Yorba Linda, Calif., assignor to Union Oil Company of California, Los Angeles, Calif., a corporation of California
No Drawing. Filed Aug. 20, 1962, Ser. No. 218,101
15 Claims. (Cl. 208—111)

This invention relates to the catalytic hydrogenation of hydrocarbons, particularly aromatic hydrocarbons, so as to effect saturation, partial saturation, and/or hydrocracking thereof, and to novel catalysts for use in such processes. The invention is particularly concerned with the hydrocracking of mineral oil fractions to produce therefrom lower boiling hydrocarbons, boiling, for example, in the gasoline range. The new hydrogenation and/or hydrocracking catalysts provided herein comprise a dehydrated, crystalline, zeolitic molecular sieve base, upon which is deposited a Group VIII metal hydrogenating component, at least a portion of said Group VIII metal component having been composited therewith by impregnation with a colloidal sulfide hydrosol thereof and preferably later reduced with hydrogen to activate the same. It has been found that catalysts composed of a zeolitic molecular sieve base and a Group VIII metal hydrogenating component are much improved in hydrogenation activity if at least a portion of the Group VIII metal is combined with the base in the form of a colloidal hydrous sulfide at some stage in the manufacture.

For purposes of hydrocracking feedstocks containing aromatic hydrocarbons, it has further been found that even more highly active catalysts are obtained if a portion of the Group VIII metal is deposited upon the molecular sieve base by ion-exchange, and another portion is composited therewith via said colloidal hydrous sulfides. It is found that catalysts containing both ion-exchanged Group VIII metal, and hydrous sulfide-composited Group VIII metal, are more active for hydrocracking aromatic feedstocks than corresponding catalysts containing the same amount of Group VIII metal deposited by either of said methods alone.

It has recently been discovered that certain zeolitic molecular sieve compositions, e.g., those of the "Y" crystal type, constitute excellent hydrogenation and/or hydrocracking catalysts when compounded by ion-exchange with Group VIII metal hydrogenation catalysts such as palladium. Ion-exchange is normally effected by digesting the zeolite, either in its sodium or ammonium form, with a suitable salt of the hydrogenating metal wherein the metal appears in the cation. It has now been found, however, that the hydrogenation activity of these catalysts can be materially improved if a part or all of the Group VIII metal is composited with the molecular sieve in the form of a colloidal hydrous sulfide, as by impregnating the molecular sieve with a hydrosol of the desired metal sulfide. The molecular sieve-metal sulfide composite is then dried and preferably reduced with hydrogen to form free metal, thus activating the catalyst.

The catalysts of this invention are particularly effective for the hydrocracking of mineral oil feedstocks which contain substantial proportions of polycyclic aromatic hydrocarbons. Where the feedstock is wholly paraffinic in nature, these catalysts are not markedly superior, and the more conventional catalysts wherein the Group VIII metal is added by ion-exchange, are substantially equal or superior in activity. The reason for this selective superiority for aromatic feedstocks is not clearly understood, but apparently, in order to effect hydrogenation of aromatics with subsequent hydrocracking, a more optimum distribution of Group VIII metal with respect to active cracking sites is obtained by combining colloidal hydrous metal sulfide with the molecular sieve base than by conventional ion-exchange or aqueous salt impregnation methods.

The colloidal sulfide-composited catalysts of this invention are not only very active for hydrogenating and hydrocracking aromatic feedstocks, but they also possess the desirable feature of producing hydrocracked products which display an unusually high ratio of iso-paraffins to normal-paraffins. This is particularly desirable for producing high-octane gasolines. The more conventional molecular sieve hydrocracking catalysts, wherein the hydrogenating metal is deposited by ion-exchange, also give high iso-paraffin/normal-paraffin ratios during the initial portion of the run when the hydrocracking temperatures are relatively low, e.g., below about 650° F. However, toward the end of the run, when the temperature is raised above about 650° F., the iso/normal-paraffin ratio declines in the case of the ion-exchanged catalyst. The catalysts of this invention however continue to produce hydrocracked products having high iso-paraffin/normal-paraffin ratios, even when the hydrocracking temperatures are elevated into the 650–800° F. range.

It is therefore the principal object of this invention to provide molecular sieve hydrogenation and hydrocracking catalysts of improved activity for the hydrogenation and/or hydrocracking of aromatic hydrocarbons. Another object is to provide hydrocracking catalysts of improved activity for hydrocracking mixed aromatic-paraffinic feedstocks. Still another objective is to maintain and prolong the activity of molecular sieve-Group VIII metal catalysts when used for the hydrogenation and/or hydrocracking of feedstocks containing aromatic hydrocarbons. Another object is to maintain high iso/normal-paraffin ratios in the products of hydrocracking. Other objects will be apparent from the more detailed description which follows.

The molecular sieve bases of this invention are partially dehydrated, crystalline compositions composed usually of silica, alumina, and one or more exchangeable zeolitic cations such as sodium, hydrogen, magnesium, calcium, etc. They are further characterized by crystal pores of relatively uniform diameter between about 6 and 14 A. Several crystal forms of such molecular sieves are now available and suitable for use herein, e.g., those of the "X," "Y" or "L" crystal types, or synthetic mordenite. It is preferred to employ molecular sieves having a relatively high $SiO_2Al_2O_3$ mole-ratio, between about 2.5 and 10, preferably between about 3 and 8. In particular, the Y molecular sieves having crystal pore diameters of about 9 to 10 A, and wherein the $SiO_2/Al_2O_3$ ratio is about 4–6, are preferred, either in their hydrogen form, or a divalent metal form, preferably magnesium. The most active hydrocracking bases are those wherein the exchangeable zeolitic cations are hydrogen and/or a divalent metal such as magnesium, calcium or zinc. However, where it is desired to minimize cracking and obtain maximum prolonged hydrogenation activity, it is preferred to use molecular sieves wherein a substantial portion, or even all, of the exchangeable cations are monovalent alkali metals, e.g., sodium or potassium.

Normally, all of these molecular sieves are prepared first in the sodium or potassium form, and these may be used as such for simple hydrogenation catalyst bases. However, where hydrocracking is desired it is preferred that the monovalent metal be ion-exchanged out with a divalent metal, or where the hydrogen form is desired, with an ammonium salt followed by heating to decompose the zeolitic ammonium ion and leave a hydrogen ion. In some cases, as in the case of synthetic mordenite, the hydrogen forms can be prepared by direct acid treatment of the alkali metal sieves. These hydrogen sieves are often referred to as "decationized." It is not necessary to exchange out all of the monovalent metal; even for purposes of hydrocracking, the final compositions may contain up to about 6% by weight of NaO, or equivalent amounts of other monovalent metals. Y sieve zeolites of this nature are more particularly described in Belgian Patents Nos. 598,582, 598,682, 598,683 and 598,686.

The essential active metals employed herein as hydrogenation components are those of Group VIII, i.e., iron, cobalt, nickel, ruthenium, rhodium, palladium, osmium, iridium and platinum, or mixtures thereof. The preferred metals are palladium, rhodium and platinum. In addition to these metals, other promoters may also be employed in conjunction therewith, including particularly the metals of Groups VIB and VIIB, e.g., molybdenum, chromium, manganese, etc. Essential to this invention however is the combination of one or more of the Group VIII metals added by impregnation with a sulfide hydrosol to one or more of the foregoing molecular sieve bases.

According to the preferred impregnation method, an aqueous sol of the desired metal sulfide or sulfides is first prepared by conventional methods, and the molecular sieve base is then impregnated with such sol. Methods for preparing colloidal sulfide hydrosols of the Group VIII metals are well known in the art (see, for example, Weiser, Inorganic Colloid Chemistry, vol. 3, Wiley & Sons, Inc., 1938, pages 249, 271–277). In general such sulfide sols are prepared simply by dissolving in water a suitable salt of the desired metal or metals, e.g., chlorides, nitrates, acetates or the like, and then adding to the solution hydrogen sulfide or ammonium sulfide. In the case of the iron group metals, it is normally desirable to use ammonium sulfide in order to form a more stable sol, and if desired, stabilizers such as ammonium tartrate, glycerine, gelatin, sugar or the like may be employed. In the case of the noble metals, sufficiently stable sols are normally obtained by simply bubbling hydrogen sulfide through a solution of the respective metal salt. In any event, it is desirable to utilize the freshly prepared sols, before substantial growth in particle size has occurred, in order to provide the most effective metal sulfide distribution upon impregnation.

The impregnation with the sulfide sols is carried out in the normal manner by immersing the powdered or pelleted molecular sieve in the sol, draining, drying and either reducing in hydrogen, or calcining in air at elevated temperatures. The direct oxidation treatment converts the metal sulfide to an oxide or sulfate, while the reducing treatment converts it to a free metal form. Normally the latter is most active and is preferred. If desired, the catalyst may first be reduced in hydrogen, and then oxidized. Suitable calcining temperatures range between about 600° and 1,200° F., and suitable reducing temperatures range between about 200° and 1,200° F.

The preferred catalysts of this invention, which contain both ion-exchanged Group VIII metal, and colloidal sulfide-incorporated Group VIII metal, may be prepared by either of two principal methods. According to the first method, the ion-exchanged portion of metal is first deposited upon the hydrous molecular sieve, followed by drying and calcining, after which the colloidal sulfide portion is added. Secondly, the colloidal sulfide portion may be first added to the molecular sieve, followed by drying and hydrogen reduction, after which the ion-exchanged portion is added, followed by a final calcining and reduction. Each of these methods can produce the desired duoform distribution of hydrogenating component on the molecular sieve base.

In the first and preferred of the foregoing methods, the molecular sieve, preferably in its sodium or ammonium form and in a hydrous state, as for example in its initially precipitated form, is digested for, e.g., 10 minutes to several hours with an aqueous solution of a suitable compound of the desired hydrogenating metal or metals wherein the metal is present in a cationic form. The exchanged catalyst may then be drained, dried and reduced to form the free metal, as described for example in Belgian Patent No. 598,686. Alternatively, in cases where the ammonium form of the sieve is employed, it is usually desirable to calcine the catalyst to decompose remaining zeolitic ammonium ion, thus forming the hydrogen or decationized form of the Group VIII metal-promoted sieve. At this point the hydrogen zeolite is sometimes hydrolytically unstable, so that damage would result if the calcined catalyst were immediately contacted with the metal sulfide sol. It is therefore desirable to subject such calcined catalysts to an intermediate dry ammoniation treatment in order to stabilize the active centers prior to contact with the metal sulfide sol. This ammoniation can be carried out for example by passing dry ammonia, or mixtures of ammonia with other gases such as hydrogen or nitrogen, over the catalyst at temperatures of 100–700° F., until it is substantially saturated. Excess non-zeolitic ammonia is then purged from the catalyst with an inert gas, and the ammoniated material is then ready for the subsequent impregnation with metal sulfide sol.

Following the metal sulfide sol impregnation, the catalyst is drained, dried, and reduced with hydrogen to convert the metal oxides and/or sulfides to the free metal. The reduced catalyst may then be calcined at temperatures of, e.g., 400–1,200° F., in order to decompose remaining zeolitic ammonium ion and convert the catalyst to a hydrogen form. Catalysts prepared in this manner are believed to contain the hydrogenating metal in two principal forms, viz., a substantially mono-atomic distribution associated with certain of the exchange sites, and a distribution of poly-atomic agglomerates resulting from the metal sulfide impregnation which are distributed more or less at random over the catalyst surface.

In the second method of preparation, where the metal sulfide is added first to the catalyst, it is also desirable to reduce and calcine the catalyst prior to the subsequent addition of metal by ion-exchange. It is also desirable to employ the intermediate dry ammoniation treatment in order to stabilize the resulting hydrogen zeolite before the subsequent ion-exchange step. Following the final addition of Group VIII metal by ion-exchange, the catalyst is again drained, dried, calcined and reduced with hydrogen to activate the same.

The amount of hydrogenating metal added by the above treatments can vary within wide ranges. Broadly speaking, any amount between about 0.1% and 20% by weight of total hydrogenating metal can be added. In the case of the noble metals, it is normally preferred to use about 0.2 to 2% by weight. In the case of the mixed ion-exchanged and colloidal sulfide-composited forms, it is preferred that at least about 10% of the total hydrogenating metal, and up to as much as 90% thereof be incorporated by each of the two methods.

The catalysts of this invention may be employed for the hydrogenation and/or hydrocracking of substantially any mineral oil fraction boiling above the conventional gasoline range, i.e., above about 300° F., and usually above about 400° F., and having an end-boiling-point up to about 1,000° F., but preferably not greater than about 850° F. These feedstocks may be sulfur-free, or they may contain up to about 5% by weight of sulfur, in the form of organic sulfur compounds. They may also contain organic nitrogen compounds, but if nitrogen compounds are present, it is ordinarily necessary to utilize hydrocracking temperatures in the upper ranges hereinafter defined. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 400° and 650° F., an API gravity between about 30 and 35°, and containing at least about 20% by volume of aromatic hydrocarbons.

Hydrocracking conditions to be employed herein fall within the following ranges:

TABLE 1

|  | Operative | Preferred |
|---|---|---|
| Temperature, °F | 400–850 | 500–750 |
| Pressure, p.s.i.g | 400–5,000 | 750–2,000 |
| H₂/oil ratio, s.c.f./B | 1,000–15,000 | 2,000–10,000 |
| LHSV | 0.1–10 | 0.5–5 |

Catalyst D was prepared in the same manner as catalyst C, except that, instead of the final impregnation with PdS sol, another 0.5% of Pd was incorporated after calcining and ammoniation by an ion-exchange method similar to that used for incorporating the initial 0.5% Pd on the uncalcined catalyst.

Each of the foregoing catalysts was then tested for hydrocracking activity, using tetralin (a typical aromatic hydrocarbon found in gas oils), as feed. The hydrocracking conditions were:

Pressure, p.s.i.g. ———————————————— 1,000.
LHSV ——————————————————————— 8.0.
H₂/oil ratio, s.c.f. B ————————————— 20,000.
Temperature as indicated in Table 2.

The results of the various runs were as follows:

TABLE 2

| Catalyst | A | | | | B | | C | | | D | | |
|---|---|---|---|---|---|---|---|---|---|---|---|---|
| Pd addition: | | | | | | | | | | | | |
| By ion-exchange | 1% Pd before calcining | | | | None | | 0.5% Pd before calcining | | | 0.5% Pd before calcining / 0.5% Pd after calcining | | |
| By sulfide sol | None | | | | 1% Pd before calcining | | 0.5% Pd after calcining | | | | | |
| Hydrocracking Temp., °F | 601 | 601 | 651 | 698 | 649 | 699 | 599 | 648 | 700 | 600 | 650 | 698 |
| Hrs. on-stream | 11 | 20 | 21 | 26 | 22 | 26 | 21 | 24 | 27 | 20 | 23 | 26 |
| Product gravity, °API | 38.2 | 22.4 | 23.9 | 22.9 | 23.9 | 25.5 | 32.8 | 25.1 | 46.7 | 21.1 | 21.3 | 21.7 |
| Product composition: C₃–C₆ paraffins, vol percent | 9.5 | 0.6 | 0.6 | 1.9 | 1.0 | 3.5 | 0.6 | 2.3 | 12.8 | 0.1 | 0.4 | 1.6 |
| Iso-/normal-paraffin ratios: | | | | | | | | | | | | |
| C₄ | 11.5 | 7.7 | 1.4 | 0.5 | 1.2 | 0.9 | 9.5 | 9.6 | 4.2 | | 1.1 | 0.7 |
| C₅ | 4.6 | | 6.5 | | 5.5 | 10 | | 5.1 | 3.8 | | | 1.7 |
| C₆ | 6.4 | | | | 3.0 | 8 | | 6.7 | 5.5 | | | 1.3 |
| Monocyclic naphthenes, vol. percent | 29 | 8 | 4 | 8 | 8 | 11 | 10 | 10 | 47 | 3 | 5 | 7 |
| Decalins, vol. percent | 52 | 42 | 43 | 18 | 39 | 21 | 88 | 82 | 48 | 36 | 30 | 19 |
| Benzene, vol. percent | 1 | 2 | 2 | 5 | 3 | 5 | 0 | 0 | 0 | 3 | 3 | 4 |
| Tetralin, vol. percent | 15 | 45 | 49 | 56 | 46 | 48 | 0 | 1 | 3 | 56 | 59 | 62 |

Depending upon the severity of the hydrocracking conditions, and the refractoriness of the feed, it will be observed that the activity of the catalysts will have declined considerably after a period of time ranging between a few hours to several months. When the activity has declined to an uneconomical level, the flow of feedstock is terminated, and the catalyst is regenerated by combustion at, e.g., 400–1,000° F., according to conventional regeneration procedures.

The following examples are cited to illustrate the invention and the results obtainable, but are not to be construed as limiting in scope:

*Example I*

A molecular sieve cracking base of the Y crystal type, having a SiO₂/Al₂O₃ mole-ratio of 4.7, in its hydrated ammonium form, was used to prepare four different Pd-containing catalysts, as follows:

Catalyst A was prepared in the conventional manner by ion-exchange before calcination, using an aqueous solution of tetrammine palladium chloride to deposit 1% by weight of zeolitic palladium on the molecular sieve. The ion-exchanged catalyst was then drained, dried, pelleted, reduced with flowing hydrogen for 16 hours at 850° F., and calcined in air at 850° F. for 16 hours, in order to decompose zeolitic NH₄ ion and convert the catalyst to a hydrogen zeolite ("decationized") form.

Catalyst B was prepared by impregnating the ammonium sieve before calcining with a freshly prepared sol of palladium sulfide to deposit 1% by weight of Pd, draining, drying, pelleting, reducing in a stream of hydrogen for 16 hours at 850° F., and then calcining in air at 850° F. for 16 hours. The palladium sulfide sol was prepared by bubbling H₂S through a 0.89% aqueous solution of ammonium tetrachloropalladate.

Catalyst C was prepared by (1) ion-exchanging 0.5% Pd onto the sieve by the procedure used for catalyst A, (2) calcining the ion-exchanged catalyst, (3) ammoniating the calcined catalyst with dry ammonia, (4) impregnating the ammoniated catalyst with 0.5% Pd as the sulfide sol by the method used for catalyst B, and (5) drying, pelleting, reducing with hydrogen and calcining as in the case of catalyst B.

It will be noted that catalyst A is quite active for the first 11 hours on-stream, but thereafter, the activity drops very rapidly.

Catalyst B on the other hand is still quite active after 26 hours on-stream, both for hydrogenation (as indicated by decalin content of the product), and for hydrocracking (as indicated by paraffin and monocyclic naphthene content). This catalyst also gave high iso-/normal-paraffin ratios at 699° F.

Catalyst C, representing the preferred catalysts of this invention, had a high sustained activity, both for hydrogenation and hydrocracking, as indicated by the lack of tetralin in the product, and the large content of paraffins and naphthenes. It also gave high iso-/normal paraffin ratios at 700° F.

Catalyst D is slightly less active than catalyst A, thus demonstrating that the improved results obtained with catalyst C were not due merely to incorporating part of the palladium after calcing the catalyst.

*Example II*

Another catalyst, E, was prepared in the same manner as catalyst A, except that 4% instead of 1% Pd was deposited on the molecular sieve by ion-exchange. This catalyst was then compared with the preferred catalyst C, containing only 1% Pd. Using the same feed and conditions as in Example I (hydrocracking temperature, 550–560° F.), the results were as follows:

TABLE 3

| Catalyst | E | C |
|---|---|---|
| Pd addition | 4% by ion-exchange | 0.5% by ion-exchange / 0.5% by sulfide sol |
| Hourly product | 25.3 | 32.2 |
| Gravities at | 22.0 | 33.4 |
| Comparable on-stream | 19.9 | 33.2 |
| Periods | 19.2 | |

It is thus evident that satisfactory hydrogenation activity cannot be maintained in the pure ion-exchanged catalysts even by quadrupling the Group VIII metal content.

Substantially similar differential results are obtained when other hydrocracking catalysts and feedstocks within the purview of this invention are substituted in the foregoing examples. It is therefore not intended that the invention should be limited to the details of the examples, but broadly as defined in the following claims.

I claim:
1. A hydrocracking process for converting a relatively high-boiling mineral oil feedstock containing a substantial proportion of aromatic hydrocarbons to lower boiling hydrocarbons having a relatively high ratio of iso/normal paraffins, which comprises contacting said feedstock plus added hydrogen with a hydrocracking catalyst at elevated temperatures and pressures, said hydrocracking catalyst comprising a zeolitic, crystalline molecular sieve cracking base having relatively uniform pore diameters between about 6–14 A., a silica/alumina mole-ratio between about 3 and 10, and having zeolitic cations from the class consisting of hydrogen and divalent metals, and deposited thereon a minor proportion of a Group VIII noble metal hydrogenating component, at least a portion of said hydrogenating component having been added to said molecular sieve base by impregnation with a colloidal sulfide hydrosol of said Group VIII metal, followed by drying and reducing the metal sulfide-molecular sieve composite.

2. A process as defined in claim 1 wherein a portion of said Group VIII noble metal hydrogenating component is incorporated into said molecular sieve base by digesting the same in an aqueous solution of a compound of said Group VIII metal wherein the metal appears in the cation, so as to effect ion exchange of said Group VIII metal into the lattice of said molecular sieve.

3. A catalyst composition comprising as the essential active ingredients (1) a zeolitic, crystalline molecular sieve base having substantially uniform crystal pore diameters between about 6 and 14 A. and (2) a minor proportion of a Group VIII metal hydrogenation component composited therewith, at least about 10% of said hydrogenating component having been composited with said molecular sieve by digesting the same in an aqueous solution of a soluble compound of said hydrogenating metal wherein the metal appears in the cation, so as to effect ion exchange of said metal onto said zeolitic molecular sieve, and at least about 10% of said hydrogenating component having been distributed on said molecular sieve by impregnating the same with a colloidal sulfide hydrosol of said Group VIII metal, followed by drying and reducing with hydrogen.

4. A catalyst as defined in claim 3 wherein said molecular sieve base is a "Y" molecular sieve having a silica/alumina mole-ratio between about 4 and 6, and comprising zeolitic cations from the class consisting of hydrogen and divalent metals.

5. A catalyst as defined in claim 3 wherein said Group VIII metal hydrogenating component is palladium.

6. A catalyst as defined in claim 3 wherein said ion-exchanged Group VIII metal is first deposited upon said molecular sieve followed by drying and calcining, and wherein the resulting calcined composite is thereafter impregnated with said Group VIII metal sulfide hydrosol.

7. A catalyst as defined in claim 6 wherein the molecular sieve containing ion-exchanged Group VIII metal is subjected to ammoniation with dry ammonia following said first calcining step and preceding said sulfide sol impregnation step.

8. A process for hydrogenating an aromatic hydrocarbon feedstock, which comprises subjecting said feedstock to hydrogenating conditions of temperature and pressure in the presence of added hydrogen and in contact with a catalyst comprising a zeolitic molecular sieve base having relatively uniform pore diameters between about 6 and 14 A., and deposited thereon a minor proportion of a Group VIII metal hydrogenating component, a portion of said hydrogenating component having been added to said molecular sieve base by impregnation with a colloidal sulfide hydrosol of said Group VIII metal, and another portion of said Group VIII metal hydrogenating component having been added to said cracking base by ion-exchange from an aqueous solution of a compound thereof wherein the metal appears in the cation, followed by drying and reducing the ion-exchanged metal sulfide-molecular sieve composite.

9. A process as defined in claim 8 wherein said molecular sieve base is a "Y" molecular sieve having a silica/alumina mole-ratio between about 4 and 6, and comprising zeolitic cations from the class consisting of hydrogen and divalent metals.

10. A process as defined in claim 8 wherein said Group VIII metal hydrogenating component is palladium.

11. A process for hydrocracking a hydrocarbon feedstock comprising aromatic hydrocarbons to produce therefrom lower boiling hydrocarbons, which comprises subjecting said feedstock to hydrocracking conditions of temperature and pressure in the presence of added hydrogen and a hydrocracking catalyst, said hydrocracking catalyst consisting essentially of (1) a crystalline zeolitic molecular sieve cracking base having a silica/alumina mole-ratio between about 2.5 and 10, relatively uniform crystal pore diameters between about 6 and 14 A., and comprising zeolitic cations from the class consisting of hydrogen and divalent metals, and (2) composited with said molecular sieve cracking base a minor proportion of a Group VIII metal hydrogenation component, a portion of said hydrogenating component having been added to said molecular sieve by impregnation with a coloidal sulfide hydrosol of said Group VIII metal, and another portion of said Group VIII metal hydrogenating component having been added to said cracking base by ion-exchange from an aqueous solution of a compound thereof wherein the metal appears in the cation, followed by drying and reducing the ion-exchanged metal sulfide-molecular sieve composite with hydrogen in order to activate the same.

12. A process as defined in claim 11 wherein at least about 10% of said Group VIII metal hydrogenation component is added to the molecular sieve cracking base by said impregnation with colloidal sulfide hydrosol, and wherein at least about 10% of said hydrogenating component is added to said molecular sieve by said ion-exchange from aqueous solution.

13. A process as defined in claim 12 wherein said ion exchanged Group VIII metal is added first to said molecular sieve, followed by calcining, and wherein the resulting calcined composite is then impregnated with said Group VIII metal sulfide hydrosol.

14. A process as defined in claim 11 wherein said Group VIII metal hydrogenating component is a noble metal.

15. A process as defined in claim 11 wherein said Group VIII metal hydrogenating component is palladium.

References Cited by the Examiner

UNITED STATES PATENTS

| | | | |
|---|---|---|---|
| 2,479,110 | 8/49 | Haensel | 208—139 |
| 2,971,904 | 2/61 | Gladrow et al. | 208—120 |
| 2,983,670 | 5/61 | Seubold | 208—110 |
| 3,119,763 | 1/64 | Haas et al. | 208—109 |
| 3,140,251 | 7/64 | Plank et al. | 208—120 |
| 3,140,252 | 7/64 | Frilette et al. | 208—119 |

ALPHONSO D. SULLIVAN, *Primary Examiner.*